(12) United States Patent
Mayo et al.

(10) Patent No.: US 11,085,899 B2
(45) Date of Patent: Aug. 10, 2021

(54) METHODS AND APPARATUS FOR ACOUSTIC ASSESSMENT FROM THE INTERIOR OF FLUID CONDUITS

(71) Applicants: PIPELINES 2 DATA (P2D) LIMITED, Aberdeen (GB); HYDRASON SOLUTIONS LIMITED, Edinburgh (GB)

(72) Inventors: Steve Mayo, Aberdeen (GB); Nigel Money, Aberdeen (GB); Chris Capus, Edinburgh (GB); Yan Pailhas, Edinburgh (GB)

(73) Assignees: Pipelines 2 Data (P2D) Limited, Aberdeen (GB); Hydrason Solutions Limited, Edinburgh (GB)

( * ) Notice: Subject to any disclaimer, the term of this patent is extended or adjusted under 35 U.S.C. 154(b) by 0 days.

(21) Appl. No.: 16/014,934

(22) Filed: Jun. 21, 2018

(65) Prior Publication Data

US 2019/0145936 A1 May 16, 2019

Related U.S. Application Data

(63) Continuation of application No. 15/109,773, filed as application No. PCT/GB2014/053858 on Dec. 31, 2014, now abandoned.

(30) Foreign Application Priority Data

Jan. 2, 2014 (GB) ..................................... 1400041

(51) Int. Cl.
*G01N 29/04* (2006.01)
*G01N 29/12* (2006.01)
(Continued)

(52) U.S. Cl.
CPC ............. *G01N 29/04* (2013.01); *G01N 29/12* (2013.01); *G01N 29/343* (2013.01);
(Continued)

(58) Field of Classification Search
CPC ...... G01N 29/04; G01N 29/12; G01N 29/343; G01N 29/348; G01N 29/4427; G01N 29/4472
See application file for complete search history.

(56) References Cited

U.S. PATENT DOCUMENTS 3,916,699 A * 11/1975 Moran .................... G01N 29/14
73/623
4,628,725 A * 12/1986 Gouilloud ............. E21B 47/101
367/31

(Continued)

*Primary Examiner* — Helen C Kwok
(74) *Attorney, Agent, or Firm* — David B. Tingey; Bryant J. Keller; Kirton McConkie

(57) ABSTRACT

The invention provides a method and apparatus for assessing a condition of a fluid conduit from its interior. The method comprises providing a measurement apparatus comprising at least one wideband acoustic transducer within the fluid conduit and transmitting a wideband acoustic signal from the measurement apparatus to excite a broadside resonance in at least a portion of the fluid conduit. A wideband acoustic signal is received in the measurement apparatus due to a broadside resonant response of the fluid conduit to obtain a wideband acoustic data set; and the data set is analysed to assess the condition of the fluid conduit.

31 Claims, 7 Drawing Sheets

(51) Int. Cl.
*G01N 29/34* (2006.01)
*G01N 29/44* (2006.01)

(52) U.S. Cl.
CPC ....... *G01N 29/348* (2013.01); *G01N 29/4427* (2013.01); *G01N 29/4472* (2013.01); *G01N 2291/101* (2013.01); *G01N 2291/106* (2013.01); *G01N 2291/2636* (2013.01)

(56) References Cited

U.S. PATENT DOCUMENTS

| | | | | | |
|---|---|---|---|---|---|
| 5,587,534 | A | * | 12/1996 | McColskey | G01B 17/02 |
| | | | | | 73/592 |
| 6,049,159 | A | * | 4/2000 | Barthe | B06B 1/0681 |
| | | | | | 310/326 |
| 6,250,159 | B1 | * | 6/2001 | Kreier | G01N 29/07 |
| | | | | | 73/602 |
| 7,246,522 | B1 | * | 7/2007 | Diaz | G01N 29/07 |
| | | | | | 73/52 |
| 7,975,548 | B2 | * | 7/2011 | Olsen | G01B 17/02 |
| | | | | | 73/602 |
| 9,670,773 | B2 | * | 6/2017 | Croux | H04B 11/00 |
| 2002/0035437 | A1 | * | 3/2002 | Tingley | G01N 29/11 |
| | | | | | 702/51 |
| 2007/0019506 | A1 | * | 1/2007 | Mandal | G01N 29/11 |
| | | | | | 367/117 |
| 2015/0204820 | A1 | * | 7/2015 | Mayo | G01N 29/4427 |
| | | | | | 73/632 |
| 2016/0202217 | A1 | * | 7/2016 | Mayo | G01N 29/4427 |
| | | | | | 73/632 |
| 2016/0327519 | A1 | * | 11/2016 | Mayo | G01N 29/12 |

\* cited by examiner

METHODS AND APPARATUS FOR ACOUSTIC ASSESSMENT FROM THE INTERIOR OF FLUID CONDUITS

CROSS REFERENCE TO RELATED APPLICATION(S)

This application is a continuation of U.S. patent application Ser. No. 15/109,773, filed Jul. 5, 2016 which is a U.S. National Stage Entry of International Patent Application No. PCT/GB2014/053858, filed Dec. 31, 2014, which claims the benefit of United Kingdom Patent Application No. 1400041.8, filed Jan. 2, 2014, the disclosures of which are hereby incorporated entirely herein by reference.

BACKGROUND TO THE INVENTION

Technical Field

The present invention relates to methods and apparatus for the acoustic assessment of fluid conduits or their features from their interiors, particularly but not exclusively to methods and apparatus assessing the condition of features of surface, subsea or subterranean pipelines, risers including marine and/or flexible risers, tubing including subterranean well tubing, and other fluid conduits used in the hydrocarbon exploration, production and transportation industries.

Aspects of the invention are methods and apparatus which use acoustic techniques for the assessment and monitoring of the internal condition of fluid conduits from their interiors, including the build-up and deposition of scale, sand, waxes and other materials on the interior surface of conduits. Alternative aspects of the invention are methods and apparatus which use acoustic techniques for the assessment, monitoring and inspection of the physical condition of a fluid conduit from its interior including defects, wall thickness, damage, holes, cracks and corrosion of a conduit or its layers.

State of the Art

Ultrasound transducers have been used in pipeline pigging applications to measure or map the profile of the inner diameter of a pipeline using single frequency pulses.

Wideband acoustic measurement techniques, which may be referred to as bio-sonar acoustic or bio-acoustic measurement techniques have been used in applications to detect and/or characterise buried objects. Examples are described in Y. Pailhas et al. (2010) (reference [1]) and P. Moore et al. (reference [2]).

WO2007/123418 (reference [3]) describes an acoustic method and apparatus for detecting a hydrate presence in a hydrocarbon pipeline. The technique relies on acoustic resonance frequencies of the pipeline walls, which imposes limitations on the application of the method to the detection or assessment of a wide range of fluid conduit conditions and on the manner in which the apparatus can be deployed.

U.S. Pat. No. 7,246,522 (reference [4]) discloses a device and method for multiparameter acoustic inspection of containers. The methods utilise dual acoustic signatures to discriminate between various fluids and materials for identification purposes. The methods rely on excitation of point resonances from the outside of the containers being inspected.

WO2010/107712 (reference [5]) describes a method and apparatus for ultrasonic inspection of a wall of a mechanical structure. The techniques are stated to use low power consumption equipment to facilitate remote operation. The methods are external, non-invasive techniques.

US 2007/0019506 (reference [6]) describes an ultrasonic imaging method for wells and tubulars using a wideband acoustic pulse fired at a wall to measure wall thickness.

It is amongst the aims and objects of the invention to provide a method of assessing a fluid conduit condition from the interior of the conduit which is improved with respect to prior art methods and apparatus for acoustic assessment. It is another aim of invention to apply bio-inspired acoustic pulses to the assessment of fluid conduit conditions from their interiors. Further aims and objects of the invention will become apparent from the following description.

SUMMARY OF THE INVENTION

According to a first aspect of the invention there is provided a method of assessing a condition of a fluid conduit from its interior, the method comprising:
  providing a measurement apparatus comprising at least one wideband acoustic transducer within the fluid conduit;
  transmitting a wideband acoustic signal from the measurement apparatus to excite a broadside resonance in at least a portion of the fluid conduit;
  receiving a wideband acoustic signal in the measurement apparatus due to a broadside resonant response of the fluid conduit to obtain a wideband acoustic data set; and
  analysing the wideband acoustic data set to assess the condition of the fluid conduit.

In the context of this specification, broadside resonance of the fluid conduit is defined as a resonance excited by a plane acoustic wave incident on the inner surface of the wall of the fluid conduit at an angle of substantially 90 degrees (substantially perpendicular) to the axis of symmetry of the conduit (or longitudinal axis). Broadside resonant response is the response elicited by a plane acoustic wave incident on the inner surface of the wall of the fluid conduit at an angle of substantially 90 degrees (substantially perpendicular) to the axis of symmetry of the conduit (or longitudinal axis).

Using a broadside resonant response gives more effective echo energy capture and thus the received signal contains more information across a wide range of frequencies. The invention in this aspect differs from the traditional spot acoustic techniques of the prior art, in which the frequency is chosen to resonate a very localised area. Typically in the prior art systems the frequency is a function of wall thickness. In contrast, the method of the present invention may select frequencies which resonate the fluid conduit, or at least a portion of the fluid conduit, by exciting lamb waves in the fluid conduit structure. Other methods use narrowband analysis to arrive at a measurement, by 'tuning' between frequency and thickness of a fluid conduit wall, rather than a genuine wideband acoustic approach.

The method may comprise using beam forming transmission and/or reception techniques.

At least one of the transmitted or received wideband acoustic signals may be transmitted or received with an axial beamwidth corresponding to a maximum angle of deviation of the longitudinal axis of the measurement apparatus with the longitudinal or along track axis of the fluid conduit.

Thus the axial beamwidth is selected to compensate for axial misalignment of the measurement apparatus in the fluid conduit by maintaining a substantially perpendicular acoustic wave incident on an inner wall of the fluid conduit, throughout the range of possible misalignment of the measurement apparatus in the fluid conduit.

In the context of this specification, the term "assessing the condition of a fluid conduit" is used to generally to refer to the overall state of the flow path defined by fluid conduit (primarily the effective flow area of the conduit), including one or more features of its internal condition which may be affected for example by build-up and deposition of scale, sand, waxes and other materials on the interior surface, and its inherent physical condition which may include the presence of defects, damage, holes, cracks, wall thickness and corrosion of the conduit or a part thereof.

The invention has particular application to detecting the presence of, measuring the extent of, and/or identifying the composition of deposits, debris and foreign bodies within fluid conduits.

The wideband acoustic signal may comprise at least one frequency in the range of approximately 150 kHz to approximately 10 MHz, and may comprise a distribution of frequencies between 150 kHz and 10 MHz.

The wideband acoustic signal may comprise a lower frequency of approximately 150 kHz, and an upper frequency of approximately 1 MHz, and may comprise a distribution of frequencies between the upper and lower frequencies. Preferably, the wideband acoustic signal comprises a lower frequency greater than 150 kHz, an upper frequency of less than 1 MHz, and comprises a distribution of frequencies between the upper and lower frequencies. In another embodiment, the wideband acoustic signal comprises a lower frequency of at least 150 kHz, an upper frequency which is at least twice the lower frequency, and comprises a distribution of frequencies between the upper and lower frequencies. The upper frequency may therefore be at least one octave above the lower frequency. In another embodiment, the upper frequency is at least two octaves above the lower frequency, and in another is at least three octaves above the lower frequency. The upper frequency may be less than four octaves above the lower frequency.

Frequencies above 150 kHz facilitate plane wave formation and mitigate against near-field corruption of measurements.

Preferably, the method comprises transmitting a wideband acoustic signal from the measurement apparatus, through a fluid which couples the measurement apparatus to at least a portion of the fluid conduit. The method may therefore be a non-contact method, in which a transmission transducer does not physically contact the fluid conduit directly. The fluid conduit may therefore be a fluid-filled conduit.

Preferably, the method comprises maintaining a distance between the at least one transducer and the fluid conduit to avoid near-field interference effects. This has the advantage of avoiding interference with the fluid conduit or any material on the interior of the fluid conduit, and enables the measurement apparatus to be translated within the fluid conduit at a desirable (higher or more consistent) speed.

The measurement apparatus may comprise a pipeline pig. Preferably the method comprises translating the measurement apparatus within the fluid conduit.

Preferably the measurement apparatus is translated within the fluid conduit (which may be a pipeline) at a speed between 0 m/s and 6 m/s during measurement operations. Translation speeds may be selected according to measurement precision demanded for a particular application: for a given beamwidth and pulse length, a higher the translation speed will insonify a greater area of the fluid conduit inner wall with a single pulse, and therefore a larger area will contribute to the measured response. A consequence is a less precise localisation of any measurement made.

The method may comprise transmitting a plurality of wideband acoustic pulses separated in time. The method may comprise transmitting a plurality of wideband acoustic pulses at a fixed transmission rate, i.e. at regular time intervals. The transmission rate may be determined by the fluid conduit diameter and/or the speed of sound in a medium within the fluid conduit. The transmission rate may be less than 2 kHz, and preferably is 1.8 kHz or less.

Alternatively, or in addition, the method may comprise triggering the transmission and/or sampling of subsequent wideband acoustic pulses according to a distance translated by the measurement apparatus in the fluid conduit. For example, the method may comprise triggering the transmission and/or sampling of subsequent wideband acoustic pulses when a fixed distance is travelled by the measurement apparatus. The distance may be less than 100 mm, and preferable is less than 20 mm. In preferred embodiments the distance is 10 mm or 3.3 mm. The transmission and/or sampling rate may be less than 2 kHz, and preferably is 1.8 kHz or less.

The fluid conduit may be an elastic conduit, for example (without limitation) a carbon steel pipe, a plastic or polymeric pipe, or a flexible pipe or flexible riser.

Preferably, the method comprises transmitting a wideband acoustic pulse with a duration of at least 10 times the acoustic wave period (or in other words, a pulse comprising at least 10 acoustic wavelengths lambda ($\lambda$)). The method may comprise transmitting a wideband acoustic pulse with a duration of less than 100 µS, and may comprise transmitting a wideband acoustic pulse with a duration of less than 70 µS. For higher frequencies, shorter pulse durations may be used. For example, the method may comprise transmitting a wideband acoustic pulse with a duration of less than 20 µS, and may comprise transmitting a wideband acoustic pulse with a duration of less than 5 µS.

Preferably, the pulse duration is selected to have a maximum (upper) constraint according to the free space within the fluid conduit, in order to preclude reception of the response signal while transmission is still in progress. Where the fluid conduit is a pipe, with diameter D, and free space between the transducer and the pipe wall d, the pulse may be selected such that 10 times the acoustic wavelength lambda ($\lambda$) is less than d.

The measurement apparatus may comprise a transmission wideband acoustic transducer and a receiving wideband acoustic transducer. Alternatively, the wideband acoustic signal may be transmitted and received from a single wideband acoustic transducer.

Preferably, the measurement apparatus comprises a plurality of acoustic transducers, and most preferably comprises a plurality of pairs of transmitting/receiving wideband acoustic transducers.

Preferably, the at least one wideband acoustic transducer comprises a composite transducer. The composite transducer preferably comprises a composite element as the active component of the transducer. The composite element may comprise a matrix of piezo-electric material pillars embedded in a polymer matrix. Preferably, at least one transmitting transducer comprises a composite transducer.

A receiving transducer may comprise a solid piezo-electric transducer or may comprise a composite transducer.

At least one receiving wideband acoustic transducer may be configured to operate in a resonant mode. Alternatively, at least one receiving wideband acoustic transducer may be configured to operate in a non-resonant mode.

The at least one wideband acoustic transducer may be configured to operate in conventional or parametric modes.

The wideband acoustic transducer preferably has a low Q-factor, and may in preferred embodiments have a Q-factor of less than 5.0. In particular embodiments the Q-factor is less than 3.0 and more preferably is less than 1.5.

The wideband acoustic transducer is preferably selected to have a high transmit and/or receive sensitivity. Preferably, the efficiency of the wideband acoustic transducer is greater than 50%, and more preferably is greater than 65%.

Preferred embodiments of the invention use a plurality of wideband acoustic transducers with similar, substantially identical, or identical specifications as defined above.

The method may comprise transmitting a wideband acoustic signal wideband acoustic signal which comprises frequencies in the range of approximately 150 kHz to approximately 1 MHz. Preferably, the method comprises transmitting a wideband acoustic signal wideband acoustic signal which comprises a lower frequency greater than 150 kHz, and an upper frequency of less than 1 MHz, and comprises a distribution of frequencies between the upper and lower frequencies.

The method may comprise transmitting a wideband acoustic signal comprising a frequency chirp. Preferably, the method comprises transmitting a wideband acoustic signal comprising a plurality of frequency chirps. Preferably, the method comprises transmitting a wideband acoustic signal comprising a plurality of stacked frequency chirps. The transmitted wideband acoustic signal may therefore comprise a complex-stacked chirped signal.

The frequency chirps may comprise down chirps. Alternatively or in addition the frequency chirps may comprise up chirps.

In one example, the wideband acoustic signal comprises a first chirp having a first frequency range, and a second chirp having a second frequency range. The second frequency range is preferably different from the first frequency range, and may be for example slightly higher than the first frequency range.

Preferably the first and second chirps overlap in time, and they may overlap for greater than 50% of the duration of the first chirp. More preferably the first and second chirps overlap for greater than 70% of the duration of the first chirp, and may overlap for greater than 80% of the duration of the first chirp. In a particular embodiment the first and second chirps overlap for around 90% of the duration of the first chirp.

The measurement apparatus may comprise a segmented annular wideband transmit and/or receive array of transducers, and the method may comprise transmitting and/or receiving over a segmented annular wideband receiver array. The number of segments may be selected according to factors including required precision, quality of signal response and influence of ambient and radiated noise sources. In one example, the measurement apparatus comprises a segmented array comprising 12 segments, each having a maximum radial beamwidth of 60 degrees. This provides overlap of adjacent beams and measurement redundancy which enables measurements to be compared/verified across adjacent array segments. In another example, the measurement apparatus comprises a segmented array comprising 4 segments, each having a maximum radial beamwidth of 90 degrees. This avoids overlap between adjacent segments. Alternative embodiments may comprise greater or fewer numbers of segments.

Preferably, the method comprises analysing the wideband acoustic data set, by comparing the data set with the database of wideband acoustic data signatures. Preferably, the method comprises analysing the frequency content of the wideband acoustic data set. The method may comprise comparing the frequency content of the wideband acoustic data set with the frequency content of previously acquired acoustic data.

Preferably, analysing the wideband acoustic data set is performed in a computer apparatus executing a computer program. Preferably a computer program comprises software algorithms for the analysis for wideband acoustic signals. The method may comprise of interrogating a database of wideband acoustic data. The wideband acoustic data may be data collected from one or more tests performed on a sample fluid conduit of known condition.

The method may comprise assessing or detecting the presence of a layer or volume of material in the fluid conduit. The layer or volume of material may be a layer or deposit of material on the inner wall or surface of the fluid conduit. The layer or deposit of material may comprise the build-up and/or deposition of scale, sand, waxes, hydrates, or other solids.

Alternatively, or in addition, the layer or volume of material may be volume of fluid in the fluid conduit. The layer or volume of fluid may be between two layers of a multi-layer fluid conduit, for example in an annulus between adjacent layers. The fluid conduit may be a flexible conduit, for example a flexible riser, and the method may comprise assessing or detecting the presence of a volume of fluid in between different layers in the flexible riser. The method may therefore comprise a method of determining or inspecting the condition of a flexible riser.

The method may comprise analysing the wideband acoustic data set to assess one or more acoustic properties or attributes of the layer or volume of material.

The method may comprise assessing a physical condition of the fluid conduit. The physical condition may comprise the presence of one or defects, damage, holes, cracks, wall thickness and/or corrosion of a conduit or its layers.

The method may comprise analysing the wideband acoustic data set to assess one or more acoustic properties or attributes a physical condition of the fluid conduit.

The fluid conduit may be selected from the group consisting of: surface, subsea or subterranean pipelines, risers including marine and/or flexible risers, and tubing including subterranean well tubing.

The fluid conduit may be a fluid conduit used in the hydrocarbon exploration, production and transportation industries.

The method may comprise modelling a fluid conduit response, and selecting one or more characteristics of a transmitted or received wideband acoustic signal based on the modelled fluid conduit response. Modelling a fluid conduit response may comprise modelling one or more physical parameters of the fluid conduit, including (but not limited to) diameter, wall thickness, fluid conduit material, internal or external coating or cladding material and/or thickness, speed of sound in a fluid medium, and/or deposits or debris located in the fluid conduit.

Preferably, selecting one or more characteristics of a transmitted or received wideband acoustic signal based on the modelled fluid conduit response comprises selecting one or more frequency characteristics of the acoustic signal.

The method may comprise designing a wideband acoustic signal having one or more acoustic characteristics and simulating a wideband acoustic signal response based on a fluid conduit model to obtain a (first) simulated wideband acoustic data set. The method may comprise analysing the simulated wideband acoustic data set.

The method may comprise perturbing at least one acoustic characteristic of the wideband acoustic signal, and simulating a second wideband acoustic signal response based on a fluid conduit model to obtain a second simulated wideband acoustic data set. The method may comprise analysing the second simulated wideband acoustic data set, which may comprise comparing the second simulated wideband acoustic data set with the first simulated wideband acoustic data set. The method may comprise optimising the wideband acoustic signal by repeating the steps of perturbing at least one acoustic characteristic of the wideband acoustic signal; simulating a wideband acoustic signal response based on the wideband acoustic signal with the perturbed characteristic; and analysing a resulting simulated wideband acoustic data set.

The method may comprise using empirical measurements to design a wideband acoustic signal. The method may comprise the step of designing a wideband acoustic signal having one or more acoustic characteristics and measuring a wideband acoustic signal response from a sample fluid conduit to obtain a (first) training wideband acoustic data set. The method may comprise analysing the training wideband acoustic data set.

The method may comprise perturbing at least one acoustic characteristic of the wideband acoustic signal, and measuring a second wideband acoustic signal response from the sample fluid conduit model to obtain a second training wideband acoustic data set. The method may comprise analysing the second training wideband acoustic data set, which may comprise comparing the second training wideband acoustic data set with the first training wideband acoustic data set. The method may comprise optimising the wideband acoustic signal by repeating the steps of perturbing at least one acoustic characteristic of the wideband acoustic signal; measuring a wideband acoustic signal response based on the wideband acoustic signal with the perturbed characteristic; and analysing a resulting training wideband acoustic data set.

Preferably the wideband acoustic signal is designed to excite a broadside or bulk resonance in at least a portion of the fluid conduit (as opposed to a point resonance or highly localised resonance).

The method may comprise perturbing an acoustic characteristic of the wideband acoustic signal to excite a broadside or bulk resonance in a simulated wideband acoustic data set or measured training wideband acoustic dataset.

The sample fluid conduit may comprise a fluid conduit having known condition, selected from (but not limited to) diameter, wall thickness, fluid conduit material, internal or external coating or cladding material and/or thickness, speed of sound in a fluid medium, and/or deposits or debris located in the fluid conduit.

The method may comprise generating a library or database of wideband acoustic data sets and/or signal responses corresponding to range of fluid conduit characteristics and/or conditions. According to a further aspect of the invention, there is provided a method of generating a library or database of wideband acoustic data sets and/or signal responses using at least some of the steps above for generating simulated and/or empirical data sets.

According to a second aspect of the invention there is provided measurement apparatus for assessing a condition of a fluid conduit from its interior, the measurement apparatus comprising:

a body and at least one wideband acoustic transducer disposed on the body;

wherein the body is configured to be disposed within a fluid conduit to be assessed; and wherein the apparatus is operable to:

transmit a wideband acoustic signal from the at least one wideband acoustic transducer into a fluid volume in the fluid conduit to excite a broadside resonance in at least a portion of the fluid conduit; and receive a wideband acoustic signal due to a broadside resonant response of the fluid conduit at the at least one wideband acoustic transducer to obtain a wideband acoustic data set.

The apparatus may comprise one or more segmented arrays of transducers.

The transducers may comprise backward or rearward facing transducers, which may be arranged to insonify the fluid conduit and/or receive a signal from a region of the fluid conduit behind the apparatus in the direction of travel. The transducers may be positioned behind one or more seals, discs and/or cups of the apparatus.

The transducers may comprise forward facing transducers, which may be arranged to insonify the fluid conduit and/or receive a signal from a region of the fluid conduit head of the apparatus in the direction of travel. The transducers may be positioned in front of one or more seals, discs and/or cups of the apparatus.

The transducers may comprise rear mounted transducers, which may be arranged to transmit a wideband acoustic signal generally in a tangential or radially perpendicular direction.

The transducers may comprise mid-mounted transducers, which are arranged to transmit a wideband acoustic signal generally in between the forward and rearward discs, seals or cups of the apparatus.

Embodiments of the second aspect of the invention may include one or more features of the first aspect of the invention or its embodiments, or vice versa.

According to a third aspect of the invention there is provided a method of assessing a condition of a fluid conduit from its interior, the method comprising:

providing a measurement apparatus comprising at least one wideband acoustic transducer within the fluid conduit;

transmitting a wideband acoustic signal from the measurement apparatus to excite at least a portion of the fluid conduit;

receiving a wideband acoustic signal in the measurement apparatus to obtain a wideband acoustic data set; and analysing the wideband acoustic data set to assess the condition of the fluid conduit;

wherein at least one of the transmitted or received wideband acoustic signals is transmitted or received with an axial beamwidth corresponding to a maximum angle of deviation of the longitudinal axis of the measurement apparatus with the longitudinal or along track axis of the fluid conduit.

Thus the axial beamwidth is selected to compensate for axial misalignment of the measurement apparatus in the fluid conduit by maintaining a substantially perpendicular acoustic wave incident on an inner wall of the fluid conduit, throughout the range of possible misalignment of the measurement apparatus in the fluid conduit.

In the context of this specification, axial beamwidth is taken to be the width of a radially propagating beam in an axial direction or long-track axis of the fluid conduit, measured at the position of the at least one transducer in the fluid conduit. Thus it is a measure of the incidence of the beam on an inner surface of the wall in the axial or longitudinal direction along the fluid conduit In one embodiment, at least one of the transmitted or received wideband acoustic signals is transmitted or received with an axial beamwidth of at least 2 degrees.

In one embodiment, at least one of the transmitted or received wideband acoustic signals is transmitted or received with an axial beamwidth of at least 4 degrees.

In one embodiment, at least one of the transmitted or received wideband acoustic signals is transmitted or received with an axial beamwidth of at least 6 degrees.

In one embodiment, at least one of the transmitted or received wideband acoustic signals is transmitted or received with an axial beamwidth of at least 8 degrees.

In one embodiment, at least one of the transmitted or received wideband acoustic signals is transmitted or received with an axial beamwidth of approximately 8 to 12 degrees.

In one embodiment, at least one of the transmitted or received wideband acoustic signals is transmitted or received with an axial beamwidth corresponding to a maximum angle of deviation of the longitudinal axis of the measurement apparatus with the longitudinal or along track axis of the fluid conduit.

Preferably, the transmitted wideband acoustic signal is transmitted with an axial beamwidth of least 2 degrees, and more preferably within a range of approximately 6 to 14 degrees.

The method may comprise transmitting a wideband acoustic signal wideband acoustic signal which comprises frequencies in the range of approximately 150 kHz to approximately 1 MHz. Preferably, the method comprises transmitting a wideband acoustic signal wideband acoustic signal which comprises a lower frequency greater than 150 kHz, and an upper frequency of less than 1 MHz, and comprises a distribution of frequencies between the upper and lower frequencies.

The method may comprise transmitting a wideband acoustic signal from the measurement apparatus to excite a broadside resonance at least in the portion of the fluid conduit. The wideband acoustic signal received in the measurement apparatus may be due to a broadside resonant response of the fluid conduit to obtain a wideband acoustic data set.

Embodiments of the third aspect of the invention may include one or more features of the first or second aspects of the invention or their embodiments, or vice versa.

According to a fourth aspect of the invention there is provided a method of assessing a condition of a fluid conduit from its interior, the method comprising:
  providing a measurement apparatus comprising at least one wideband acoustic transducer within the fluid conduit;
  transmitting a wideband acoustic signal from the measurement apparatus to excite at least a portion of the fluid conduit;
  receiving a wideband acoustic signal in the measurement apparatus to obtain a wideband acoustic data set; and
  analysing the wideband acoustic data set to assess the condition of the fluid conduit;
  wherein at least one of the transmitted or received wideband acoustic signals is transmitted or received with a radial beamwidth greater than 10 degrees.

In the context of this specification, radial beamwidth is taken to be the angular width of a radially propagating beam in a circumferential direction of the fluid conduit, measured at the position of the at least one transducer in the fluid conduit. Thus it is a measure of the incidence of the beam on an inner surface of the wall in the circumferential direction around the fluid conduit.

At least one of the transmitted or received wideband acoustic signals may be transmitted or received with a radial beamwidth greater than 20 degrees.

At least one of the transmitted or received wideband acoustic signals may be transmitted or received with a radial beamwidth in a range of approximately 10 degrees to approximately 90 degrees.

The method may comprise transmitting a wideband acoustic signal which comprises frequencies in the range of approximately 150 kHz to approximately 1 MHz. Preferably, the method comprises transmitting a wideband acoustic signal which comprises a lower frequency greater than 150 kHz, and an upper frequency of less than 1 MHz, and comprises a distribution of frequencies between the upper and lower frequencies.

The method may comprise transmitting a wideband acoustic signal from the measurement apparatus to excite a broadside resonance at least in the portion of the fluid conduit. The wideband acoustic signal received in the measurement apparatus may be due to a broadside resonant response of the fluid conduit to obtain a wideband acoustic data set.

Embodiments of the fourth aspect of the invention may include one or more features of the first to third aspects of the invention or their embodiments, or vice versa.

According to a fifth aspect of the invention there is provided a method of analysing data acquired according to any previous aspect of the invention.

Embodiments of the fifth aspect of the invention may include one or more features of the first to fourth aspects of the invention or their embodiments, or vice versa.

According to a sixth aspect of the invention there is provided a method of acquiring data using an apparatus according to the second aspect of the invention.

According to a seventh aspect of the invention there is provided a measurement apparatus for assessing a condition of a fluid conduit, the apparatus comprising:
  a body and at least one wideband acoustic transducer disposed on the body;
  wherein the apparatus is operable to:
  transmit a wideband acoustic signal from the at least one transducer into a fluid volume coupled to the at least a portion of the fluid conduit;
  receive a wideband acoustic signal at the at least one wideband acoustic transducer to obtain a wideband acoustic data set.

Embodiments of the seventh aspect of the invention may include one or more features of the first to sixth aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1:
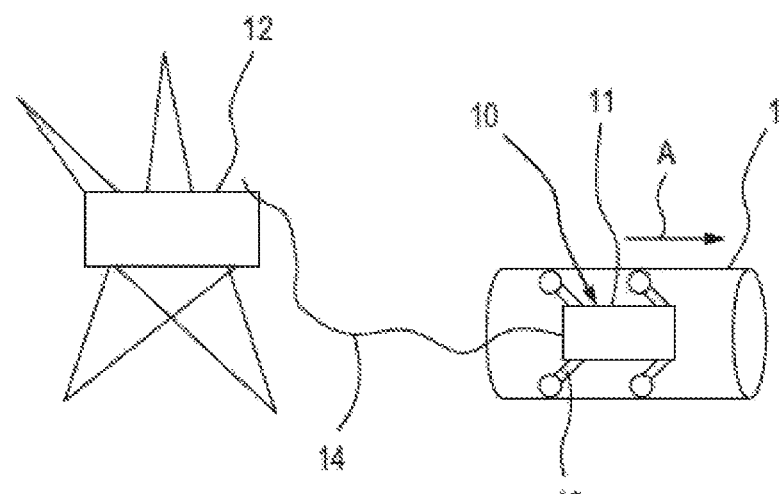
FIG. 1 is a schematic representation of an internal fluid conduit measurement apparatus according to a first embodiment of the invention, shown in situ in a fluid conduit.

There will now be described, by way of example only, various embodiments of the invention with reference to the drawings, of which:

FIG. 1 shows schematically an apparatus 10 according to a first embodiment of the invention which is used to perform an assessment method on a fluid conduit, in this case a hydrocarbon pipeline 1, from its interior.

The apparatus 10 is configured to be operated inside the pipeline (and is effectively a pipeline pig). The apparatus comprises a body 11 on which are located a plurality of wideband acoustic transducers (not shown). The body 11 is centralised in the pipeline by contact arms 16, which comprise measurement callipers and optionally comprise mounted for wheels. The apparatus 10 is operated from a hydrocarbon production platform 12, and is tethered to the platform by tether 14. In this embodiment, the tether 14 is an umbilical and provides power and data communication between the apparatus and the deployment point (in this case the platform 12). This enables real-time viewing of the data remotely from the apparatus, as well as data storage on the pig itself. The apparatus 10 is driven through the pipeline 1 by fluid flowing in the pipeline, and tether 14 can be used to pull the apparatus 10 back to the platform 12 after running. Where wheels are provided on the contact arms 16, the wheels can be used to drive the apparatus along the pipeline and/or reverse the direction of the apparatus to return the apparatus to the platform. The wheels may also be coupled to an odometer to provide an accurate measurement of the speed and distance travelled in the fluid conduit. A 6-axis inertial measurement unit (IMU) is also provided (not shown) to provide data relating to the pitch, roll a yaw or heading of the pig.

Figure 2:
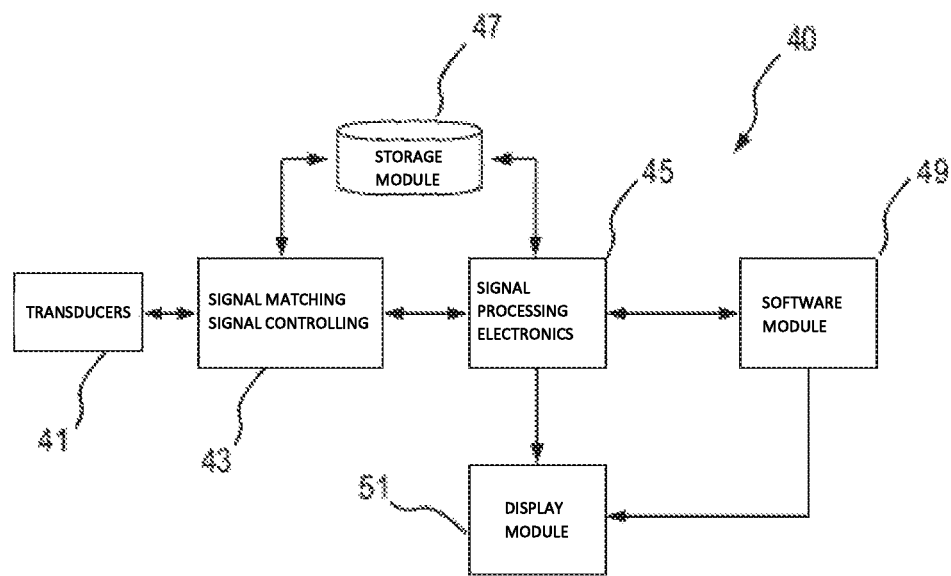
FIG. 2 is a schematic representation of the functional components of the fluid conduit measurement apparatus of FIG. 1.

FIG. 2 shows schematically (as a block diagram) a system 40 of functional components of the fluid conduit measurement apparatus 10 of FIG. 1. The system 40 comprises transducers 41, which include an array of transmitting transducers and an array of receiving transducers. The transducers 41 can be mounted in a number of ways depending on system requirements. For example, the transmitting and receiving transducers can be operated in either conventional or parametric modes depending upon application. The acoustic transducers may be configured and distributed in a number of ways on the body of the apparatus. These include (without limitation);

a. Separate transmit and receive transducer elements spatially distributed around the body.
b. Integrated transmit and receive transducer elements spatially distributed around the body.
c. Separate transmit and receive ring segments spatially distributed around the body.
d. Integrated transmit and receive ring segments spatially distributed around the body.
e. Separate transmit and receive transducer elements configured as an acoustic array for the purpose of beam forming spatially distributed around a body.
f. Integrated transmit and receive transducer elements configured as an acoustic array for the purpose of beam forming spatially distributed around a body (i.e. multi-element arrays).
g. Multiple and varying combinations of the above configurations depending upon the application, for example 3 transmit ring segments each at 120° and a 360° multi-element receive array.

In this embodiment, the transducers are arranged in a helical path on the body. The transmitting transducers are designed to work in a resonant mode and across a broad range of frequencies with a low Q factor (which is less than 3).

To achieve the desired low transmission Q factor, the transmitting acoustic transducers comprise a composite element as the active component of the transducer. The composite transduction materials comprise a matrix of piezo-electric material pillars embedded in a polymer matrix.

The receiving acoustic transducers are designed to work either in a resonant or non-resonant mode. The receiving acoustic transducer can comprise either a solid piezo-electric material as the receiving element or composite material depending upon application and mode of operation (i.e. whether operated in resonant or non-resonant modes).

The system comprises electronics 43 for signal matching and/or signal conditioning. The electronics 43 comprise application-specific tailored networks of passive electronic components, and function to maximise efficiency in the process of transferring electrical energy generated by the system into acoustic energy and maximise efficiency in the process of transferring acoustic energy returning to the apparatus from fluid conduit into electrical energy for computation. The electronics 43 are designed to preserve the fidelity of the transmitted and received wideband broadband signals across the chosen frequency bandwidth.

Storage module 47 is typically be a large volume solid state drive or card to enable the large amounts of data generated by the system to be stored and recovered. Alternatively, standard hard drives may be used. The storage is mounted onboard the apparatus 10 itself in a pressure vessel on the pig. The storage module 47 stores data during the run and allows data recovery once the operation is complete. Alternatively (or in addition) data storage could be remote to the apparatus. For example, in a tethered implementation of FIG. 1, the data are transmitted to a remote location from the pig location to be stored and viewed.

The system comprises signal processing electronics 45, and a software module 49 running software algorithms for the analysis for wideband acoustic signals. Information derived from the signal processing may be provided visually and/or audibly via the display module 51.

In use, a transmitting transducer transmits a wideband acoustic signal. The signal is coupled to the pipeline via fluid or slurry contained in the pipeline to excite the pipeline and generate broadside resonance of the fluid conduit. A broadside resonance is a resonance excited by a plane acoustic wave incident on the inner surface of the wall of the fluid conduit at an angle of substantially 90 degrees (i.e. substantially perpendicular) to the axis of symmetry of the conduit (or longitudinal axis).

When travelling through a fluid filled conduit the apparatus can be used for a range of fluid assessment operations. These include (but are not limited to:

Detecting the presence of and measuring the extent of debris and deposits within fluid filled conduits, for example the thickness and distribution of wax;

Identifying the nature and composition of debris and deposits within fluid filled conduits, for example characterising the wax deposits into soft, medium, hard;

Assessing the degree of strain in conduits, for example bends in flexible risers;

Assessing the extent of structural disturbance in conduits, for example water ingress in flexible risers following a breach in external protective coatings;

Assessing the structural integrity of fluid filled conduits, for example the presence of defects and changes in geometry through time;

Assessing the nature and composition of the fluid phase within the conduit, for example discriminating between fluid and multiphase flows;

Assessing the nature of the conduit to environment interface, for example is the fluid filled conduit in contact with water, sediment or rock.

More details of the transducer configuration and measurement operations according this embodiment and alternative embodiments will be described below.

Figure 3:
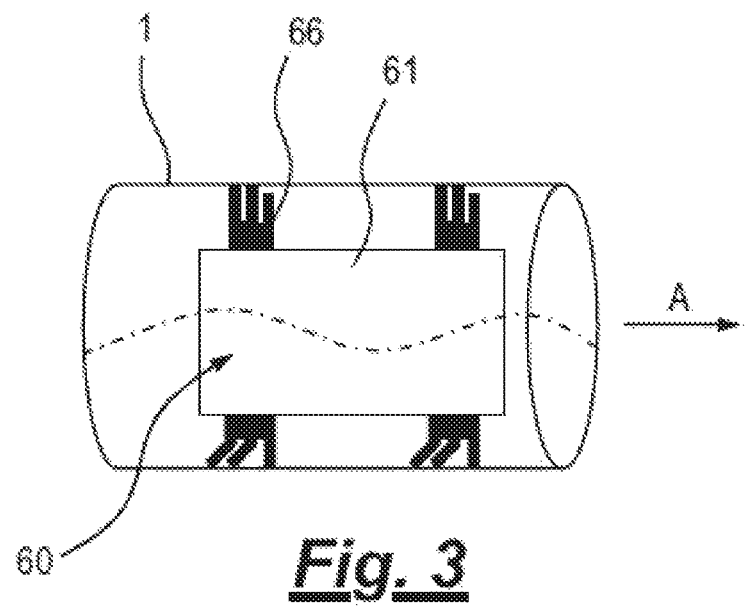
FIG. 3 is a schematic representation of an internal fluid conduit measurement apparatus according to a second embodiment of the invention, shown in situ in a fluid conduit.

Referring now to FIG. 3, there is shown a measurement apparatus 60 according to an alternative embodiment of the invention. The apparatus 60 is a pipeline pig. The apparatus 60 is similar to the apparatus 10 and will be understood from FIGS. 1 and 2 and the accompanying description. However, the apparatus 60 is a modified cup or seal disc pig comprising a body 61 mounted with discs or cups 66. The wideband acoustic transducers are mounted on the body 61. The apparatus 60 is designed to be driven by differential pressure developed across the pig due to product flow. Data are acquired with limited processing and stored on board for post-processing and analysis after the operation is complete. This apparatus 60 is particularly applicable to oil, gas, water and multiphase pipelines.

Figure 4:
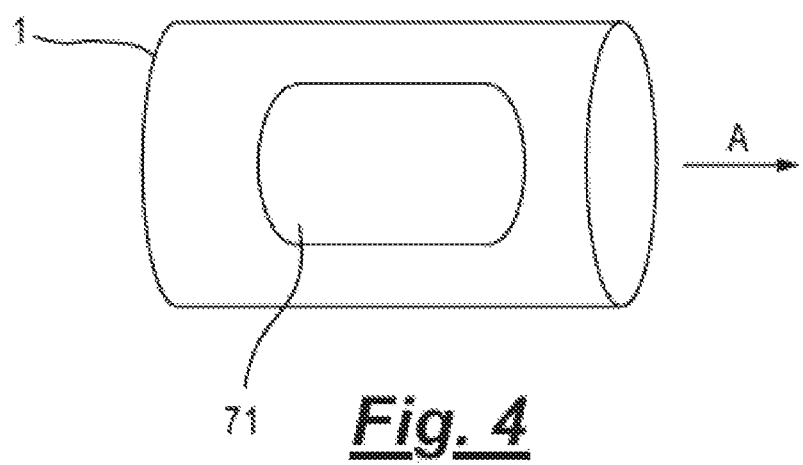
FIG. 4 is a schematic representation of an internal fluid conduit measurement apparatus according to a third embodiment of the invention, shown in situ in a fluid conduit.

Referring now to referring now to FIG. 4, there is shown a measurement apparatus 70 according to an alternative embodiment of the invention. The apparatus 70 is similar to the apparatus 60 and will be understood from FIG. 3 and the accompanying description. However, the apparatus 70 is a free floating neutrally buoyant pipeline pig. The wideband acoustic transducers and other electronics components are mounted in the body 71. The apparatus 70 is designed to be neutrally buoyant and be driven by product flow. Data are acquired with limited processing and stored on board for post-processing and analysis after the operation is complete. This apparatus 70 is particularly applicable to oil, water and multiphase pipelines.

Figure 5:
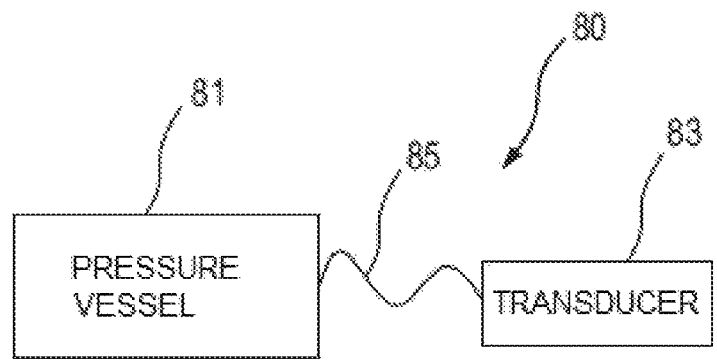
FIG. 5 is a schematic representation of internal components of a fluid conduit measurement apparatus according to an embodiment of the invention.

FIG. 5 shows schematically an arrangement 80 of internal components of the apparatus according to an embodiment of the invention. In this embodiment, a pressure vessel (or pressure resistant electronics pod) 81 contained within a pig body houses the electronics modules and components (items 43, 45, 47, 49 in FIG. 2), and the transducers are located separately from the pressure vessel 81. Communication between the transducers and the electronics is via data line 85.

Figure 6:
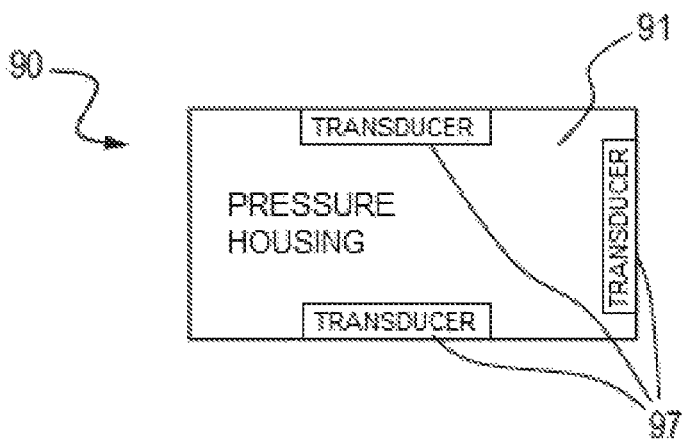
FIG. 6 is a schematic representation of internal components of a fluid conduit measurement apparatus according to an alternative embodiment of the invention.

FIG. 6 shows schematically an alternative arrangement 90 of internal components of the apparatus. In this embodiment, the transducers are mounted on and form part of the pressure housing 91. This option has a more limited scope for transducer mounting but may have useful benefits in some applications.

Figure 7:
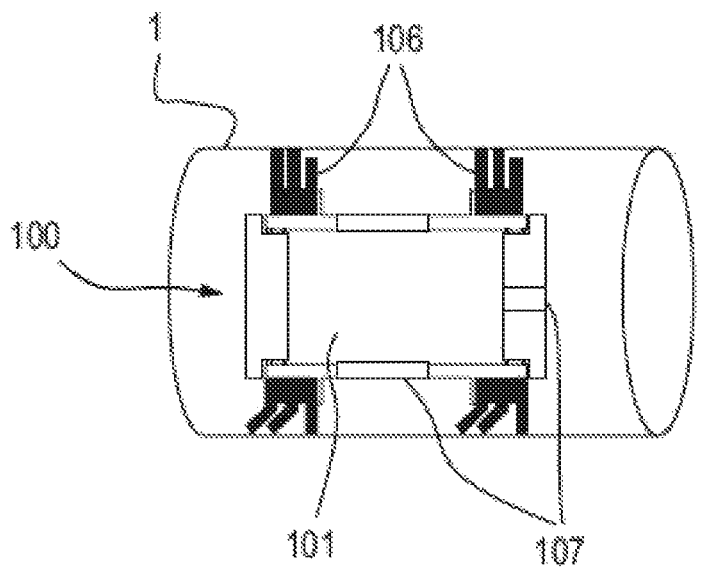
FIG. 7 is a schematic representation of internal components of a fluid conduit measurement apparatus according to a further alternative embodiment of the invention.

FIG. 7 shows schematically an alternative arrangement 100 of internal components of the apparatus, shown in situ in a fluid conduit 1. In this embodiment, the apparatus is a modified cup or seal pig (similar to the pig 60 of FIG. 3), and a pressure housing 101 forms the body of the pig itself. The electronics are mounted on a chassis inside the pig and the transducers located in the appropriate place on the body to give the most suitable view of the pipeline/pipeline wall. This embodiment is most suited (without limitation) to small diameter pipelines, e.g. an inner diameter of less than 300 mm (12 inches).

As noted above, there are a number of different ways in which the transducers may be configured depending on application. In particular in certain applications there may be benefit to moving the location of the transducers on the pig and altering their incident angle on the pipe wall. FIGS. 8A to 8E illustrate examples of transducer configurations in the context of a cup or seal pig (similar to the pig 60 of FIG. 3).

Figure 8A:
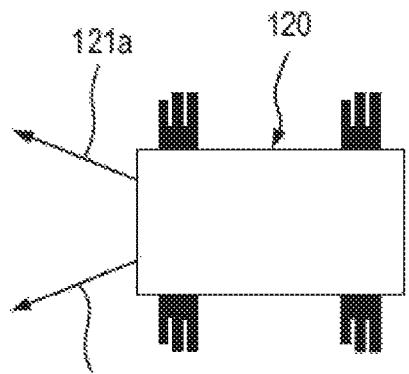
FIGS. 8A to 8E are schematic representations of transducer configurations of measurement apparatus according to various alternative embodiments of the invention.

FIG. 8A shows a pig 120 which comprises backward or rearward facing transducers, which are arranged to transmit a wideband acoustic signal generally in the direction of arrows 121a and 121b. This configuration will insonify the fluid conduit and receive a signal from a region of the fluid conduit behind the pig in the direction of travel (and behind the seals and cups) of the pig. This configuration may provide an effective assessment of the fluid conduit after the pig has had some cleaning or dislodging effect on any material present in the fluid conduit.

Figure 8B:
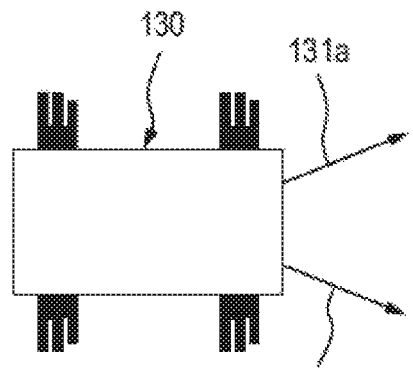

FIG. 8B shows a pig 130 which comprises forward facing transducers, which are arranged to transmit a wideband acoustic signal generally in the direction of arrows 131a and 131b. This configuration will insonify the fluid conduit and receive a signal from a region of the fluid conduit ahead the pig in the direction of travel (and ahead of the seals and cups) of the pig. This configuration may provide an effective assessment of the fluid conduit before the pig has dislodged or disrupted any material present in the fluid conduit.

Figure 8C:
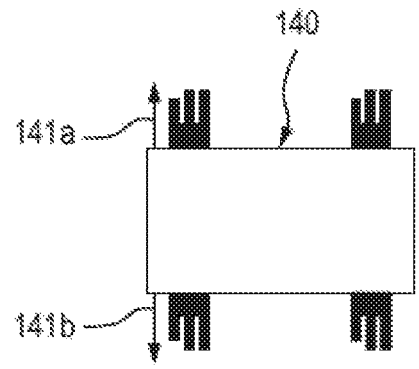

FIG. 8C shows a pig 140 which comprises rear mounted transducers, which are arranged to transmit a wideband acoustic signal generally in the direction of arrows 141a and 141b in a tangential or radially perpendicular direction. This configuration will insonify the fluid conduit and receive a signal from a region of the fluid conduit behind the pig in the direction of travel (and behind the seals and cups) of the pig, similar to the configuration of FIG. 8A, but may have the advantage of an improved excitation of a broadside resonant response in the fluid conduit.

Figure 8D:
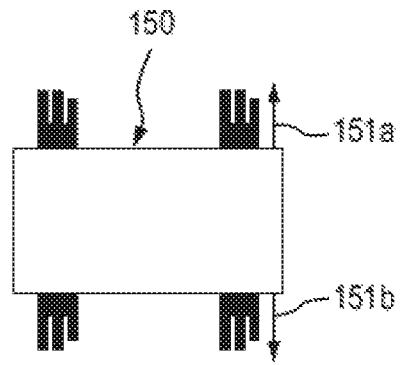

FIG. 8D shows a pig 150 which comprises forward mounted transducers, which are arranged to transmit a wideband acoustic signal generally in the direction of arrows 151a and 151b in a tangential or radially perpendicular direction. This configuration will insonify the fluid conduit and receive a signal from a region of the fluid conduit ahead of the pig in the direction of travel (and ahead of the seals and cups) of the pig, similar to the configuration of FIG. 8B, but may have the advantage of an improved excitation of a broadside resonant response in the fluid conduit.

Figure 8E:
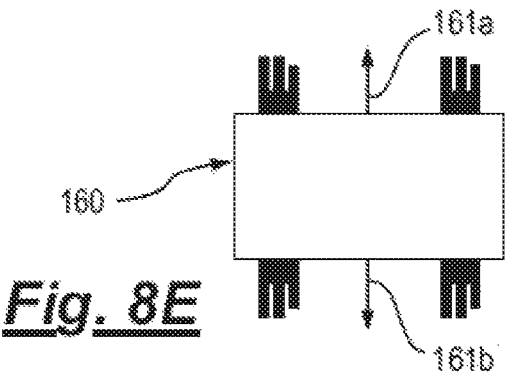

FIG. 8E shows a pig 160 which comprises mid-mounted transducers, which are arranged to transmit a wideband acoustic signal generally in the direction of arrows 161a and 161b in a tangential or radially perpendicular direction. This configuration will insonify the fluid conduit and receive a signal from a region of the fluid conduit between the forward and rearward cups of the pig.

Alternatively, or in addition, in some applications the fluid conduit volume behind the pig may contain a fluid which provides improved acoustic coupling between the transducers and the fluid conduit (i.e. fluid volumes present behind the pig, in front of the pig, or between the forward and rearward cups. The different transducer configurations allow effective acoustic coupling through the preferred fluid.

As described above, embodiments of the present invention excite broadside resonances in the fluid conduit using the wideband acoustic techniques. One factor which improves the broadside resonant response is directing the transmitted wideband acoustic beam towards the inner surface of the wall of the fluid conduit at an angle of substantially 90 degrees (substantially perpendicular) to the axis of symmetry of the conduit (or longitudinal axis).

Typically, an apparatus in accordance with the invention will be designed to remain aligned with the along track (or longitudinal) axis of the fluid conduit in which it is being run. In the case of a cup and disc seal pig, this is achieved by the symmetrical centralising force applied by the cups and discs. In some applications, it may not be possible to guarantee alignment of the pig with the along track axis.

Figure 9A:
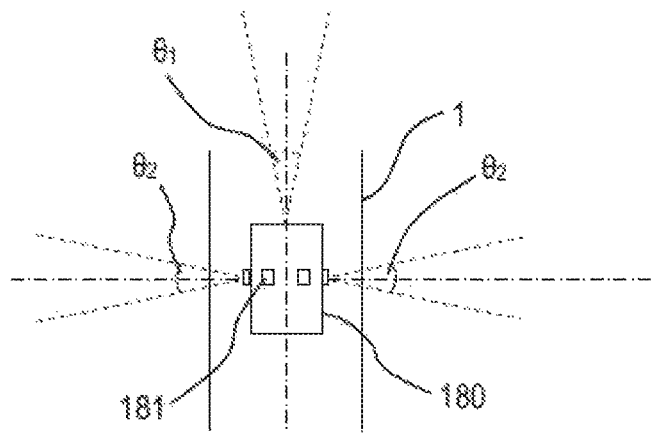
FIGS. 9A and 9B are respectively schematic representations from plan and cross-sectional views depicting axial and radial beamwidths according to embodiments of the invention.

FIG. 9A shows schematically a measurement apparatus in the form of a pig 180 in situ in a fluid conduit 1, shown in plan view. The pig is designed to have its longitudinal axis aligned with the along track axis of the fluid conduit, but has an operational deviation from alignment of $\pm\theta_2$. This translates to a misalignment of the normal to the pig body from the normal to the inner wall of the fluid conduit. Thus, a radial beam transmitted from the pig body at an angle normal to the body, will not be incident on the inner wall at a perpendicular angle.

The present embodiment mitigates against this deviation by transmitting the acoustic signal with a beamwidth in the axial direction of the fluid conduit. The axial beamwidth, shown in FIG. 9A as $\theta_2$ is taken to be the width of a radially propagating beam in an axial direction or long-track axis of the fluid conduit, measured at the position of the at least one transducer in the fluid conduit. Thus it is a measure of the incidence of the beam on an inner surface of the wall in the axial or longitudinal direction along the fluid conduit If the axial beamwidth $\theta_2$ is designed to be equal to or greater than $2\theta_1$, the acoustic beam will always have a component incident on the inner wall fluid conduit at an angle of substantially 90 degrees (substantially perpendicular) to the axis of symmetry of the conduit (or longitudinal axis), throughout the operational deviation of the pig from alignment with the fluid conduit.

A typical cup and disc seal pig may have a maximum deviation of $\pm 5°$ from the along track axis, and therefore a preferred embodiment may have an axial beamwidth of 10°. Other pig designs may have greater or lesser operational deviations, and therefore the radial beamwidth may be selected accordingly.

Figure 9B:
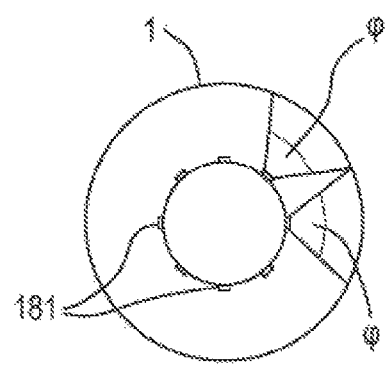

FIG. 9B shows the same apparatus 180 in situ in a fluid conduit 1 from an end view. The apparatus has an array of transducers arranged around the surface of the apparatus in a ring. Each transducer is designed to transmit a wideband acoustic signal with a radial beamwidth $\varphi$ in the circumferential dimension of the apparatus and the fluid conduit.

The apparatus therefore provides a segmented annular wideband transmit and/or receive array of transducers 181. The number of segments may be selected according to factors including required precision, quality of signal response and influence of ambient and radiated noise sources. In the example shown, the measurement apparatus comprises a segmented array comprising eight segments, each having a radial beamwidth $\varphi$ of 45°. This avoids overlap of adjacent beams.

Variations are of course possible within the scope of the invention. A minimal four segment system might have 90° beamwidths per segment to ensure full radial coverage of the pipe, but with limited resolution. However, an alternative embodiment comprises a 72-segment system with 10° beamwidths per segment providing 50% overlap with adjacent segments. Such a configuration guarantees 2:1 redundancy in measurements, which would have benefits for profiling and verification. However, such a system is relatively costly and has higher power-consumption. Alternative embodiments may comprise greater or fewer numbers of segments: there are of course any number of potential variants in between all of which could work well under different constraints/conditions.

Figure 10:
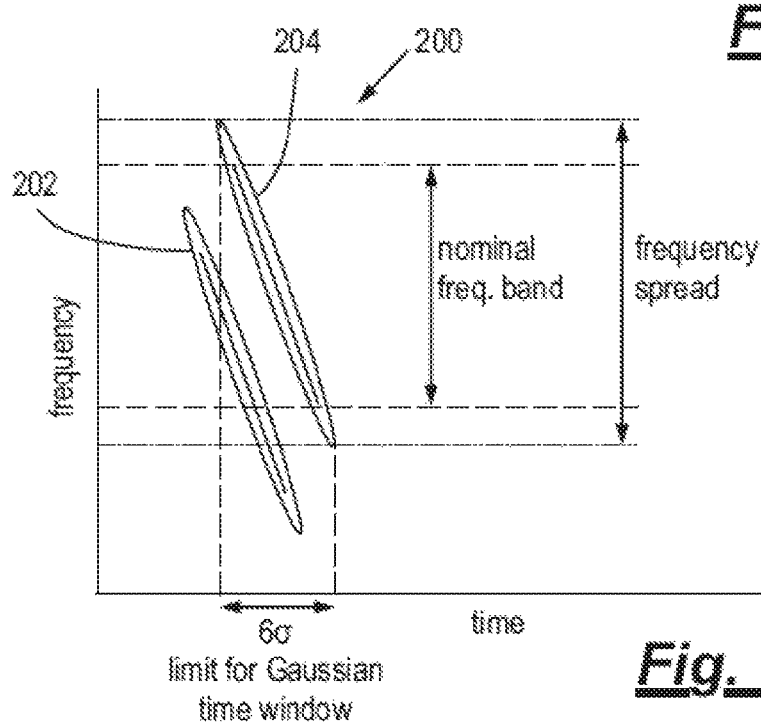
FIG. 10 is a plot of a bio-inspired wideband acoustic signal, as may be used in preferred embodiments of the invention.

FIG. 10 is a graphical diagram 200 showing an example of the design of a bio-inspired wideband acoustic signal, as may be used in preferred embodiments of the invention. The graph 200 plots frequency against time. The signal comprises a pair of overlapping down chirps 202, 204, which overlap in time to generate the acoustic excitation pulse.

Figure 11A:
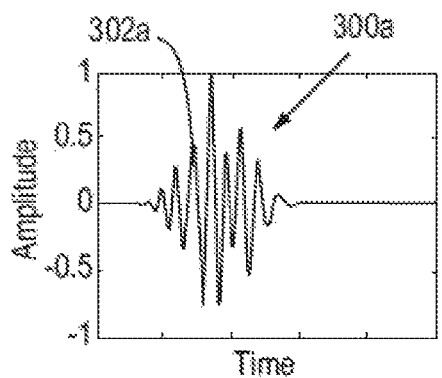
FIGS. 11A, 11B; 12A, 12B; and 13A to 13B are plots of bio-inspired wideband acoustic pulses, as may be used in preferred embodiments of the invention.
Figure 11B:
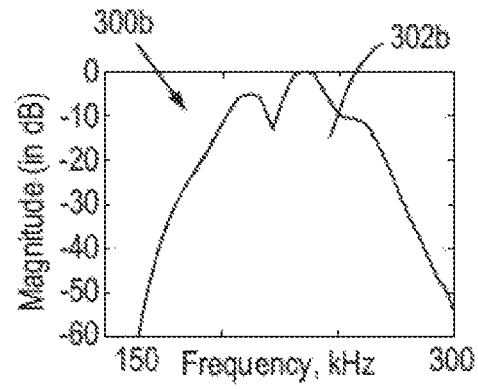

FIGS. 11A, 11B; 12A, 12B; and 13A to 13B are examples of plots of bio-inspired wideband acoustic pulses, as may be used in preferred embodiments of the invention. In each case, the first plot in each drawing (suffixed "A") shows the pulse in the time domain, and the second plot (suffixed "B") shows the pulse in the frequency domain.

In FIGS. 11A and 11B, the plots 300a, 300b, show a wideband acoustic signal 302a, 302b with a frequency range of approximately 150 kHz to over 300 kHz, and a distribution of frequencies across that range. Thus the signal has a bandwidth greater than one octave.

Figure 12A:
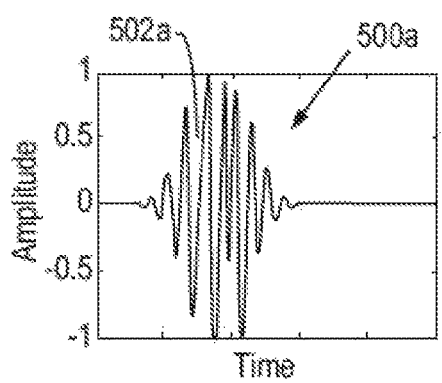
Figure 12B:
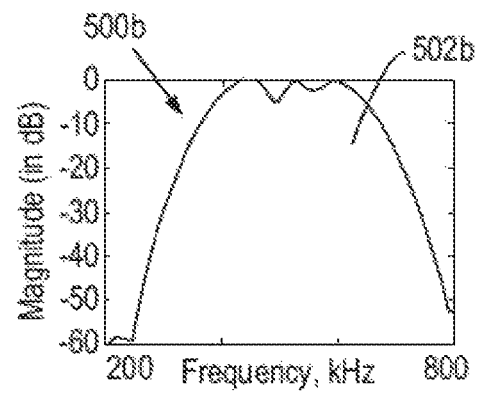

In FIGS. 12A and 12B, the plots 500a, 500b, show a wideband acoustic signal 502a, 502b with a frequency range of approximately 200 kHz to about 800 kHz, and a distribution of frequencies across that range. Thus the signal has a bandwidth spanning around two octaves.

Figure 13A:
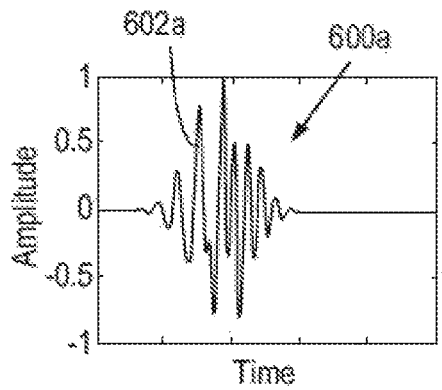
Figure 13B:
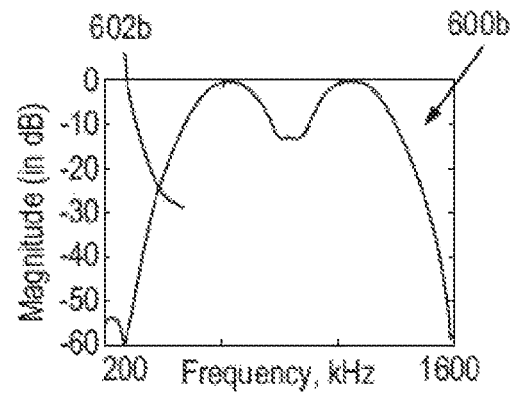

In FIGS. 13A and 13B, the plots 600a, 600b, show a wideband acoustic signal 602a, 602b with a frequency range of approximately 200 kHz to about 1.6 MHz, and a distribution of frequencies across that range. Thus the signal has a bandwidth spanning around three octaves.

The design of wideband acoustic signals in accordance with FIGS. 10 to 13B (i.e. with a frequency range of approximately 150 kHz to about 1.6 MHz, overcomes limitations of the technique of the prior art including WO2007/123418, which is reliant on 'tuning' resonant frequencies of pipeline walls. The selection of frequencies in the range of 150 kHz to about 1.6 MHz facilitates a range of applications to fluid conduit assessment or inspection.

Figure 14:
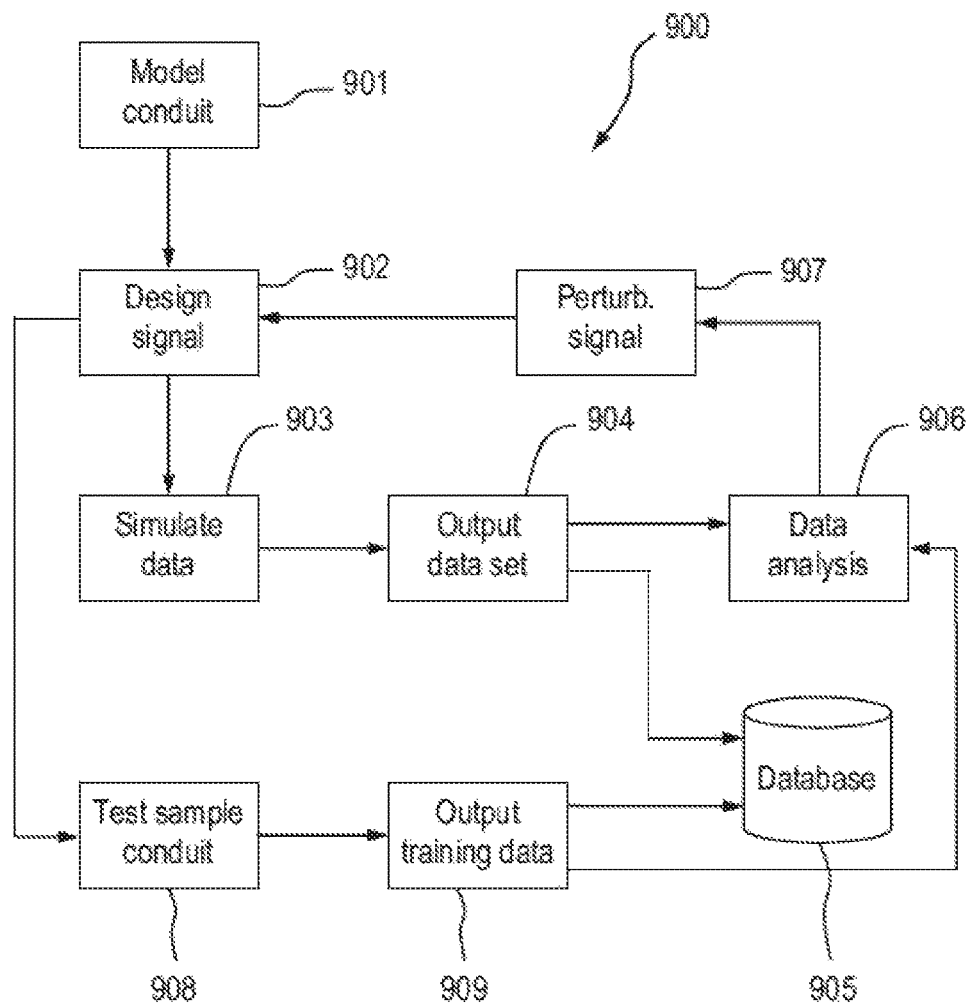
FIG. 14 is a flow diagram representing steps of a training method according to an embodiment of the invention.

Prior to use of the measurement apparatus of the invention, it is beneficial to educate or train the system using modelling and empirical data collection. FIG. 14 shows schematically a method 900 by which the system is educated or trained.

As a first step, a model of the fluid conduit system to be assessed is generated, and may include (without limitation) parameters such as diameter, wall thickness, fluid conduit material, internal or external coating or cladding material and/or thickness, speed of sound in a fluid medium, and/or deposits or debris located in the fluid conduit. This generated model (step 901) is used with a preliminary transmission signal designed or selected (step 902) according to the modelled conditions. The signal from 902 is run in a computer model (step 903) to generate a simulated data set which is output (step 904) for storage (step 905) and/or data analysis (step 906). The data analysis 906 determines the effectiveness of the designed transmission pulse for the model. The designed signal can then be optimised by modifying the signal and repeating the data simulation. This may for example comprise perturbing at least one acoustic characteristic of the wideband acoustic signal, and simulating a second wideband acoustic signal response based on the fluid conduit model to obtain a second simulated wideband acoustic data set. This data set can be compared with the first, and it can be determined whether the second signal is more effective for the fluid conduit modelled.

As an alternative to the above, or as a subsequent method, a designed signal can be used in a measurement operation in a sample fluid conduit having one or more known characteristics. The signal from 902 (which may be optimised by a modelling method as described above) may be used in the sample fluid conduit (step 908) and a training data set may be output (step 909) from the apparatus for storage (905) and/or analysis (906). The results of the data analysis may be used in further optimise the designed signal by perturbing a characteristic and repeating the measurement.

The above-described simulated and/or empirical data can be used to help design a signal and pulse which is tailored to the particular characteristics of the conduit. In particular, the techniques may be used to generate a pulse which is likely to generate a strong broadside resonant response (by modelling or actual detection of a broadside response in a sample conduit).

In addition, the data may be stored to generate a library of acoustic profiles associated with the known condition of the sample conduit. The database of acoustic profiles can be referenced during real measurement operations in order to characterise fluid conduit features. This may be by recognition of, for example, a fluid conduit with no debris or with a substantial amount of debris, or may be by inferring an intermediate fluid conduit condition by comparison with the data.

In practice as the systems are run a database of responses from specific conduits, specific types of conduit and related pipe types are collated. From these knowledge of known and expected responses of pipes under 'normal' operating conditions are built up. This knowledge will iteratively improve with each run (system education). Once the known normal responses have been logged, anomalies are readily recognisable. With additional data gathered against known defects, these anomalies will become associated with known problem conditions or known structural observations (for example, field joints). A database of known anomalies can then be built up (further system education), so that anomalies, which may include flaws, debris, sand, wax may be detected.

A method of use will now be described by way of example. The measurement system has previously been "educated" to allow features and material compositions of interest to be identified. This relates to both the transmitted signal and how the algorithms process the received data.

The measurement apparatus is a modified pig such cup pig. The apparatus is self-powered using onboard batteries and activated either by the operator via a switch, by the pipeline pressure using a pressure activated switch or remotely using a wireless interface.

The invention is placed in the pipeline using a standard pig launcher and is driven down the pipeline by the fluid flow in the pipeline. The transducers of the apparatus are maintained at a distance between the at least one transducer and the fluid conduit to avoid near-field interference effects. This enables the measurement apparatus to be translated within the fluid conduit at a desirable (higher or more consistent) speed. Typically the measurement apparatus is translated within the fluid conduit speed of between 0 and 5 m/s. As the pig moves in the pipe, multi-axis position, velocity and acceleration sensors are used to log the position, rotation and orientation of the pig relative to the pipe axis. This enables distribution estimation for deposits and debris from any differential responses measured in different segments of the annular array.

The system transmits wideband acoustic pulses into the fluid medium into the conduit as the conduit is traversed. With any acoustic measurement the speed of sound is critical in determining range. If the speed of sound is not known it can be measured using a fixed baseline and pulse echo measurement. The transmitted pulses have frequencies typically in the range of 150 kHz and 1 MHz, and span around 1 to 2 octaves.

The measurement apparatus records data as it traverses the pipeline. This data acquisition could be time based (for example every 0.01 seconds a sample is taken) or distance based (for example every 0.01 m the pig travels a sample is taken). Distance is determined using odometer wheels that output a signal at fixed distance intervals. Data stored is raw data converted from analogue signals or part-processed data. The return signal is affected by the acoustic properties experienced between transmission and detection, including acoustic properties of the pipeline and any layer deposited on the inside of the pipeline. Analysing the return data set enables the presence of a layer or deposit to be detected by the apparatus.

When the pig reaches the end of the pipeline it is received in to a pig receiver and removed from the pipeline. The apparatus will de-activate either by operator intervention, pressure switch de-activation, or remote control by wireless interface. Once removed from the pipeline data is downloaded from the invention and post-processing carried out that specifically relates to the type of features/material composition etc that is of interest. The data can then be viewed and conclusions/inferences made from that data. For example, by comparison with acoustic signatures collected from layers or deposits of known thickness, profile and/or composition enables a detected layer or deposit to be characterised. The method therefore enables characteristics of the layer or deposit to be inferred from the detected acoustic wideband signal.

Such analysis can be performed using software algorithms, and the acoustic signatures may be stored as a data set within a database. The frequency content of the return signal can also be analysed, and may be compared with the frequency content of such signature acoustic data sets.

The invention provides a method of and apparatus for assessing a condition of a fluid conduit from its interior. The method comprises providing a measurement apparatus comprising at least one wideband acoustic transducer within the fluid conduit and transmitting a wideband acoustic signal from the measurement apparatus to excite a broadside resonance in at least a portion of the fluid conduit. A wideband acoustic signal is received in the measurement apparatus due to a broadside resonant response of the fluid conduit to obtain a wideband acoustic data set; and the data set is analysed to assess the condition of the fluid conduit.

The method and apparatus of the invention may be used to detect layers attached to the wall of a fluid conduit. Using the bulk response from the wideband signal of the attached layers, it is possible to map hydrate and wax build-up. In addition, annular layers attached to the wall, e.g. wax build-up, will alter the measured wideband response. The response will be linked to material type and distribution.

The invention also enables detection of debris lying in a fluid conduit. Debris echoes can be used to map position of debris deposits in the fluid conduit, as debris will affect the broadside wideband responses of the fluid conduit. The differences will vary between segments of the annular receive array depending on distribution of the debris. The responses will be affected most greatly towards the bottom of the fluid conduit and the response changes will be expected to depend on the type of debris present.

An evaluation the condition of the fluid conduit may also be performed using the wideband signal returns to characterise the fluid conduit condition. Corrosion, thinning and structural flaws will all affect the broadside resonance properties of the pipe. The precise configuration of the transducer arrays and speed of the pig platform determine the resolution with which these condition 'changes' can be measured.

The invention also has application to gas-filled fluid conduits. In such applications a wave guide would be used to facilitate acoustic propagation to the pipe wall/debris. This could for example be a gel, fluid bag or other.

Various modifications may be made within the scope of the invention as herein intended, and embodiments of the invention may include combinations of features other than those expressly described above. For example, where the apparatus is described above as performing an assessment method on a hydrocarbon pipeline, it will be appreciated that the apparatus (and the assessment method) is equally applicable to other fluid conduits including surface, subsea or subterranean pipelines, risers including marine and/or flexible risers, and tubing including subterranean well tubing.

REFERENCES

[1] Y. Pailhas, C. Capus, K. Brown, and P. Moore, "Analysis and classification of broadband echoes using bio inspired dolphin pulses," J. Acoust. Soc. Am., vol. 127, no. 6, pp. 3809-3820, 2010.

[2] P. Moore, H. Roitblat, R. Penner, and P. Nachtigall. Recognizing successive dolphin echoes with an integrator gateway network. Neural Networks, 4:701-709, 1991.

[3] WO2007/123418
U.S. Pat. No. 7,246,522
WO2010/107712
US 2007/0019506

What is claimed is:

1. A method of assessing a condition of a fluid conduit from a conduit interior, the method comprising:

providing a measurement apparatus comprising at least one wideband acoustic transducer within the fluid conduit;

transmitting a wideband acoustic signal from the measurement apparatus to excite a broadside resonance in at least a portion of the fluid conduit, wherein the broadside resonance is resonance excited by a plane acoustic wave incident on an inner surface of a wall of the fluid conduit at an angle of substantially 90 degrees to a longitudinal axis of the conduit;

wherein the wideband acoustic signal is in a range of approximately 150 kHz to 10 MHz, and comprises a distribution of frequencies between 150 kHz and 10 MHz;

receiving a wideband acoustic signal in the measurement apparatus due to a broadside resonant response of the fluid conduit to obtain a wideband acoustic data set, wherein the broadside resonant response is the response elicited by a plane acoustic wave incident on the inner surface of the wall of the fluid conduit at an angle of substantially 90 degrees to the longitudinal axis of the conduit; and analysing the wideband acoustic data set to assess a state of a flow path defined by the fluid conduit.

2. The method according to claim 1, wherein at least one of the transmitted or received wideband acoustic signal is transmitted or received with an axial beamwidth corresponding to a maximum angle of deviation of a longitudinal axis of the measurement apparatus with the longitudinal axis of the fluid conduit.

3. The method according to claim 1, comprising at least one of: (i) detecting a presence of, (ii) measuring an extent of, and (iii) identifying a composition of deposits, debris and foreign bodies within the fluid conduit.

4. The method according to claim 1, comprising transmitting the wideband acoustic signal from the measurement apparatus through a fluid which couples the measurement apparatus to at least a portion of the fluid conduit.

5. The method according to claim 1, comprising translating the measurement apparatus within the fluid conduit.

6. The method according to claim 1, comprising transmitting a wideband acoustic pulse with a duration of at least 10 times an acoustic wave period, or a duration of less than 100 µS or transmitting a plurality of wideband acoustic pulses separated in time or at a fixed transmission rate.

7. The method according to claim 1, comprising transmitting the wideband acoustic signal comprising a frequency chirp, a plurality of frequency chirps, a plurality of stacked frequency chirps or a complex-stacked chirped signal.

8. The method according to claim 1, wherein the transmitted wideband acoustic signal comprises a first chirp having a first frequency range, and a second chirp having a second frequency range.

9. The method according to claim 1, comprising at least one of (i) transmitting and (ii) receiving over a segmented annular wideband receiver array.

10. The method according to claim 1, comprising analysing the wideband acoustic data set by comparing the data set with a database of wideband acoustic data signatures.

11. The method according to claim 1, comprising comparing a frequency content of the wideband acoustic data set with a frequency content of a previously acquired acoustic data set.

12. The method according to claim 1, comprising interrogating a database of wideband acoustic data, wherein the acoustic data is data collected from one or more tests performed on a sample fluid conduit of known condition.

13. The method according to claim 1, comprising analysing the wideband acoustic data set to assess one or more acoustic properties or attributes of a physical condition of the fluid conduit.

14. The method according to claim 1, comprising modelling a fluid conduit response, and
selecting one or more characteristics of a transmitted or received wideband acoustic signal based on a modelled fluid conduit response.

15. The method according to claim 1, comprising:
designing a wideband acoustic signal having one or more acoustic characteristics, and
simulating a first wideband acoustic signal response based on a fluid conduit model to obtain a first simulated wideband acoustic data set.

16. The method according to claim 15, comprising perturbing at least one acoustic characteristic of the transmitted wideband acoustic signal, and
simulating a second wideband acoustic signal response based on a fluid conduit model to obtain a second simulated wideband acoustic data set, and
analysing the second simulated wideband acoustic data set.

17. The method according to claim 16, comprising optimising the transmitted wideband acoustic signal by repeating the perturbing at least one acoustic characteristic of the transmitted wideband acoustic signal;
simulating a wideband acoustic signal response based on the transmitted wideband acoustic signal with the perturbed acoustic characteristic; and
analysing a resulting simulated wideband acoustic data set.

18. The method according to claim 1, comprising designing a wideband acoustic signal having one or more acoustic characteristics, and
measuring a first wideband acoustic signal response from a sample fluid conduit to obtain a first training wideband acoustic data set.

19. The method according to claim 18, comprising analysing the first training wideband acoustic data set.

20. The method according to claim 18, comprising perturbing at least one acoustic characteristic of the transmitted wideband acoustic signal, and
measuring a second wideband acoustic signal response from the sample fluid conduit model to obtain a second training wideband acoustic data set.

21. The method according to claim 20, comprising analysing the second training wideband acoustic data set.

22. The method according to claim 21, comprising optimising the transmitted wideband acoustic signal by repeating the perturbing at least one acoustic characteristic of the transmitted wideband acoustic signal;
measuring a wideband acoustic signal response based on the transmitted wideband acoustic signal with the perturbed acoustic characteristic; and
analysing a resulting training wideband acoustic data set.

23. The method according to claim 1, comprising using empirical measurements to design a wideband acoustic signal.

24. The method according to claim 1, comprising perturbing an acoustic characteristic of the transmitted wideband acoustic signal to excite a broadside or bulk resonance in a simulated wideband acoustic data set or measured training wideband acoustic dataset.

25. The method according to claim 1, comprising generating a library or database of at least one of (i) wideband acoustic data sets and (ii) signal responses corresponding to a range of at least one of (a) fluid conduit characteristics and (b) conditions.

26. A measurement apparatus for assessing a state of a flow path of a fluid conduit from a conduit interior, the measurement apparatus comprising:
a body and at least one wideband acoustic transducer disposed on the body; wherein the body is configured to be disposed within the fluid conduit to be assessed; and wherein the apparatus is operable to:
transmit a wideband acoustic signal from the at least one wideband acoustic transducer into a fluid volume in the fluid conduit to excite a broadside resonance in at least a portion of the fluid conduit; wherein the broadside resonance is resonance excited by a plane acoustic wave incident on an inner surface of a wall of the fluid conduit at an angle of substantially 90 degrees a longitudinal axis of the conduit and wherein the wideband acoustic signal is in a range of approximately 150 kHz to 10 MHz, and comprises a distribution of frequencies between 150 kHz and 10 MHz; and
receive a wideband acoustic signal due to a broadside resonant response of the fluid conduit at the at least one wideband acoustic transducer to obtain a wideband acoustic data set for analysis of the state of the flow path of the fluid conduit; wherein the broadside resonant response is the response elicited by a plane acoustic wave incident on the inner surface of the wall of the fluid conduit at an angle of substantially 90 degrees to the longitudinal axis of the conduit.

27. The apparatus according to claim 26, wherein the transducer comprises backward or rearward facing transducers, which are arranged to at least one of (i) insonify the fluid conduit and (ii) receive a signal from a region of the fluid conduit behind the apparatus in a direction of travel.

28. The apparatus according to claim 26, wherein the apparatus comprises a plurality of pairs of transmitting/receiving wideband acoustic transducers.

29. The apparatus according to claim 26, wherein the apparatus comprises one or more segmented arrays of transducers.

30. The apparatus according to claim 26, wherein the apparatus comprises a pipeline pig.

31. The method according to claim 1, wherein the transmitted wideband acoustic signal comprises a lower frequency of approximately 150 kHz, and an upper frequency of approximately 1 MHz, and comprises a distribution of frequencies between the upper frequency and the lower frequency.

* * * * *